No. 809,369. PATENTED JAN. 9, 1906.
W. H. GREENE.
AUTOMATIC DEVICE FOR PHOTOGRAPHIC PURPOSES.
APPLICATION FILED APR. 21, 1905.
2 SHEETS—SHEET 1.
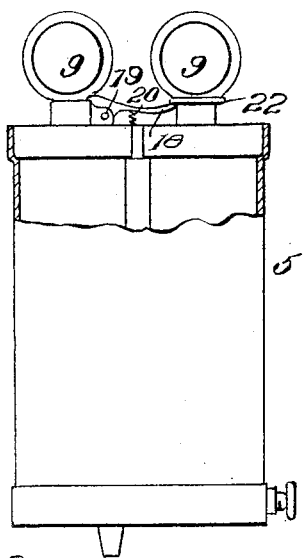
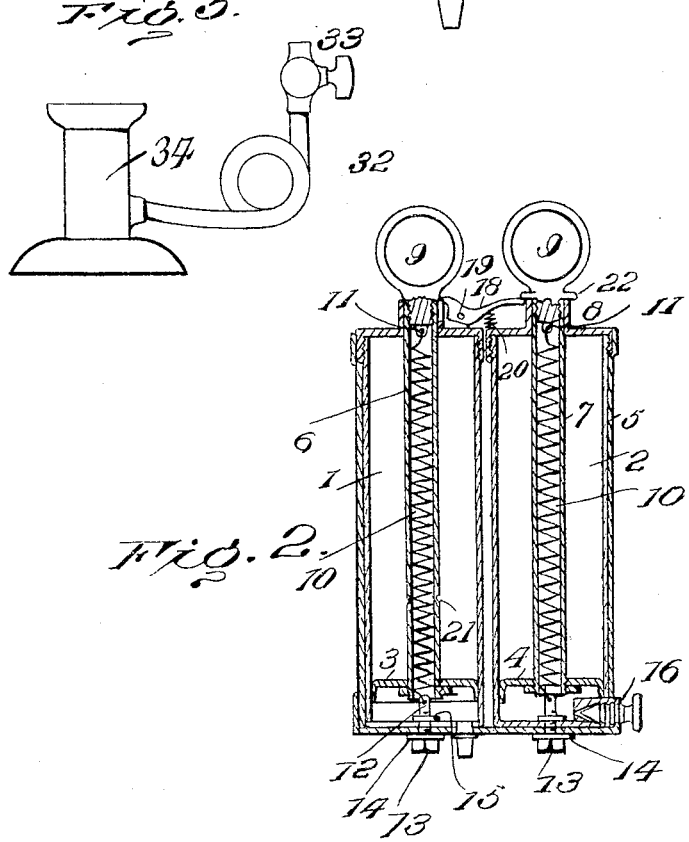
Inventor
W. H. Greene No. 809,369. PATENTED JAN. 9, 1906.
W. H. GREENE.
AUTOMATIC DEVICE FOR PHOTOGRAPHIC PURPOSES.
APPLICATION FILED APR. 21, 1905.
2 SHEETS—SHEET 2.
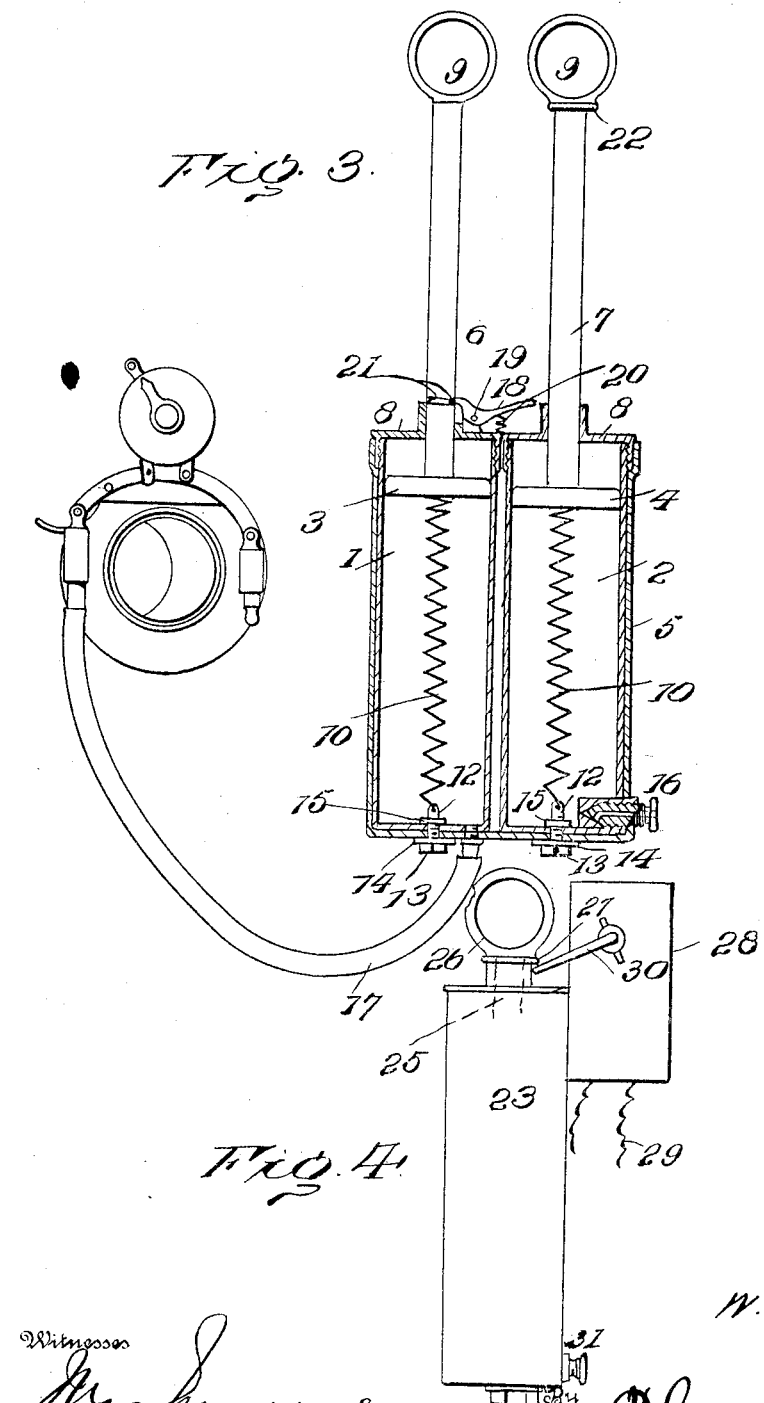

UNITED STATES PATENT OFFICE.

WILLIAM H. GREENE, OF PROPHETSTOWN, ILLINOIS.

AUTOMATIC DEVICE FOR PHOTOGRAPHIC PURPOSES.

No. 809,369.　　　　　Specification of Letters Patent.　　　　Patented Jan. 9, 1906.

Application filed April 21, 1905. Serial No. 256,753.

*To all whom it may concern:*

Be it known that I, WILLIAM H. GREENE, a citizen of the United States, residing at Prophetstown, in the county of Whiteside and State of Illinois, have invented certain new and useful Improvements in Automatic Devices for Photographic Purposes, of which the following is a specification.

This invention consists of a simple device particularly adapted for use in photographic operations, and designed especially for automatically actuating the shutter of the camera or for operating means for firing a flash-lamp or the like.

As is well known, a picture is often considered incomplete and unsatisfactory because the person who is taking the same cannot usually be included in the picture, since he has to operate the camera, the flash-light, or some similar means; and it is the essential object of this invention, therefore, to enable such a person by means of the device comprising said invention to arrange all the details, such as grouping, &c., and then by adjustment of the device comprising the invention he may connect the same with the camera or with the flash-light or such means, so that same may be automatically operated at a predetermined time, as desired, and such time will be ample for him to take his place and be included in the picture, whatever it may be.

For a full description of the invention and the merits thereof and also to acquire a knowledge of the details of construction of the means for effecting the result reference is to be had to the following description and accompanying drawings, in which—

Figure 1 is a side elevation of a device comprising this invention, the jacket surrounding the parts being partially broken away. Fig. 2 is a vertical sectional view, parts arranged in positions assumed thereby when the device is not in use. Fig. 3 is a view similar to Fig. 2, the device being set preparatory to operating parts with which it may be connected. Fig. 4 is a side elevation of a modified adaptation of the invention for use in automatically closing an electric circuit which may fire a flash-light or the like. Fig. 5 is a detail view of the connection which may be used for connecting the device with a flash-lamp.

Corresponding and like parts are referred to in the following description and indicated in all the views of the drawings by the same reference characters.

In the preferred construction of the invention the same consists of a pneumatically-operating device, and for this purpose it is preferred to employ two cylinders 1 and 2, in which operate pistons 3 and 4. The cylinders 1 and 2 may be connected in any suitable way to form a substantial device and are preferably surrounded by a jacket or shell 5 for purposes of appearance and to house the cylinders. The pistons 3 and 4 are provided with suitable piston-rods 6 and 7, respectively, said rods passing through the upper heads 8 of the cylinders in which they are mounted. It is preferred to form the heads 8 as removable caps in order to have access to the interior of the cylinders 1 and 2 and to facilitate the removal of the pistons and interior parts for the purposes of repair or otherwise. Each piston-rod is provided with a suitable handle 9 at its upper extremity exterior of the cylinders 1 and 2, said handles enabling the pistons to be drawn to the upper extremities of the cylinders, as will be described hereinafter. The piston-rods 6 and 7 are of tubular or hollow formation, and a spring 10 is arranged in each piston-rod, said spring being connected at one end with its adjacent piston-rod near the upper end portion of the latter, as shown at 11, the opposite end of each spring being attached to a stem 12, which is removably attached to the lower head of each cylinder. The stem 12 is threaded at its lower extremity and passes through the lower head of the cylinder, receiving a suitable nut 13 and washer 14, interposed between said nut and the cylinder-head. Each stem 12 has an inner flange 15 abutting against the inner side of the lower end of each cylinder.

Near the lower extremity of the cylinder 2 or arranged in any suitable position upon the cylinder is an air-valve 16, preferably of the needle type, and said air-valve is adapted to admit of escape of air from the cylinder 2 in the actual operation of the device. The valve 16 is adjustable, and the air is thus permitted to escape more or less quickly, according to the adjustment of said valve. Leading from the lower portion of the cylinder 1 is an air-outlet tube 17. It will be noted that when the handles 9 are grasped and the pistons 3 and 4 forced to the upper portions of the cylinders in which they are mounted air will be drawn into the lower portions of the cylinders, and the provision of the springs 10 affords a means normally tending to hold the pistons near the lower extremities of said cylinders. As shown in Fig. 2, the pistons 3 and 4 are mainly comprised of flexible disks or washers, and the piston-rods 6 and 7 fit loosely in the heads or caps 8 of the cylinders, so that in withdrawing the pistons 3 and 4 air may pass into the upper portions and pass by the pistons into the lower portions of the said cylinders. The pressure of the air upon the under sides of the pistons 3 and 4 serves to expand the same, so that they virtually have an air-tight joint with the cylinders and prevent the air from escaping. The pistons 3 and 4 are of a form commonly employed in various ways. The piston-rod 6 in the cylinder 1, however, is adapted to be locked in its withdrawn position after the piston 3 has been forced toward the upper portion of the cylinder 1 by means of a catch 18, which is pivoted to the head 8 of the cylinder 1, as shown at 19, an expansive coil-spring 20 being interposed between said catch 18 and the head 8 aforesaid, so that the catch is normally held in contact with the piston-rod 6. One end of the catch 18 is adapted to engage in a groove 21, formed in the lower extremity of the piston-rod 6, and the opposite end of the catch extends into proximity with the piston-rod 7 of the cylinder 2. Near the upper portion of the piston-rod 7 is located an annular projection or flange 22 integrally or otherwise connected therewith, and this projection 22 is designed to come into contact with the adjacent end of the catch 18 to actuate said catch and disengage the latter from the piston-rod 6, whereupon the piston 3 under the influence of the spring 10 coöperating therewith will be suddenly forced toward the lower end of the cylinder 1 in which it is mounted.

Describing the actual operation of the device above set forth the same is particularly constructed for use with cameras the shutters of which are operated by a pressure-bulb in actual use, and the device is substituted for the pressure-bulb, the tube 17, which leads from the cylinder 1, being connected for the operation of the shutter in the same manner as the pressure-bulb would ordinarily be connected. In taking a picture the operator will properly focus and adjust the camera and, if necessary, group persons if the picture includes any persons. The valve 16 being closed and the camera being ready for the exposure the handle 9 of the piston-rod 7 is grasped and the piston 4 is pulled toward the upper extremity of its handle against the tension of its spring 10. The piston 3 is now disposed in a similar position by operating the piston-rod 6 thereof, and when said piston has reached a predetermined position in its upper movement the catch 18 will engage in the groove 21 thereof. The operator now opens the valve 16 more or less, depending upon how much time he desires to allow before the movement of the piston 4 will bring the projection 22 into contact with the lever 18, and then the operator may step into the range of the camera or place himself among the group of persons who are to be photographed, as the case may be, and the gradual escape of the air from the cylinder 2 will cause the piston 4 to gradually move toward the lower end of the cylinder under the influence of the spring 10. At a predetermined time the projection 22, striking the catch 18, will disengage said catch from the piston-rod 6, and the sudden movement of the piston 3 toward the lower extremity of the cylinder 1, actuated by its spring 10, will force air through the tube 17 and operate the shutter of the camera in the well-known manner.

In Fig. 4 is illustrated a modification of the invention in which a single cylinder 23 is used with a piston operating therein, said piston having a piston-rod 25 with a handle 26 and projection 27, the parts 23, 25, 27, and 26 being virtually the same as the parts 2, 7, 22, and 9 shown in the preferred construction of the invention. The device in Fig. 4 is designed primarily for automatically closing an electric circuit, which may be connected with a flash-lamp for firing the latter or use in a similar way. As an attachment for use in connection with the device a small casing 28 is preferably secured to a side of the cylinder 23, and terminals of wires 29 included in the electric circuit are insulated in the casing 28 aforesaid, suitable contacts being provided therefor. It is designed that the terminals of the wires 29 in the casing 28 be electrically connected by a contact member arranged in the casing, said contact member being actuated by an arm 30, pivoted to the casing and extending at one end into the path of movement of the projection 27, carried by the piston-rod 25. The piston-rod 25 being spring-actuated and the cylinder 23 having a suitable valve 31 to permit the air to escape therefrom, it will be seen that when the piston connected with the piston-rod 25 is forced toward the upper extremity of the cylinder 23 and the valve 31 opened to an adjustment determined by the operator the movement of the piston-rod 25 under the actuation of its spring will force the projection 27 into engagement with the pivoted arm or member 30, said member being moved so as to electrically connect the terminals of the wires 29, and thus close the circuit which fires the flash-light.

Under certain conditions the device shown in Fig. 1 might be so connected with a flash-lamp to furnish a blast therefor, and in Fig. 5 is illustrated the connection which would be made between the parts. The numeral 32 in Fig. 5 indicates a tube which would be operatively connected with the cylinder 1 and substituted for the tube 17, the tube 32 having connection with the flash-light lamp 34 to supply air thereto and having a valve 33 in the length thereof to govern the force of the air passing through said tube 32 and to be operated in an obvious manner by the user of the mechanism.

Having thus described the invention, what is claimed as new is—

1. In a device of the class described, the combination of a cylinder and a piston therefor, a second cylinder and piston, means for actuating said pistons, means for holding one of said pistons in a predetermined position, and means operable by the other piston for actuating the holding means coacting with the piston above mentioned.

2. In a device of the class described, the combination of a cylinder, a valved outlet for said cylinder, a second cylinder, spring-actuated pistons operating in the cylinders, piston-rods for said pistons, means for holding the piston-rod of the second-mentioned cylinder in an ascertained position against the tension of the spring coöperating therewith, and means operated by the piston-rod of the first-mentioned cylinder for actuating the means holding the piston-rod of the second-mentioned cylinder in the ascertained position aforesaid.

3. In a device of the class described, the combination of the cylinders 1 and 2, pistons operating in said cylinders, piston-rods extending from the pistons aforesaid, spring means for holding the pistons in a predetermined position, a catch coöperating with the piston-rod of the cylinder 1, means carried by the piston-rod of the cylinder 2 for actuating said catch, and a valve for the cylinder 2.

4. In a device of the class described, the combination of the cylinders 1 and 2, pistons operating in said cylinders, piston-rods extending from the pistons aforesaid, spring means for holding the pistons in a predetermined position, a catch coöperating with the piston-rod of the cylinder 1, means carried by the piston-rod of the cylinder 2 for actuating said catch, a valve for the cylinder 2, and handles operatively connected with the piston-rods of the cylinders 1 and 2.

5. In a device of the class described, the combination of the cylinders 1 and 2, pistons operating in said cylinders, piston-rods for said pistons springs connecting the cylinders and the piston-rods for holding the pistons in a predetermined position, a catch coöperating with the piston-rod of the cylinder 1, and means carried by the piston-rod of the cylinder 2 for actuating said catch.

6. In a device of the class described, the combination of the cylinders 1 and 2, pistons operating in said cylinders, piston-rods for said pistons, springs connecting the cylinders and the piston-rods for holding the pistons in a predetermined position, a spring-actuated catch coöperating with the piston-rod of the cylinder 1, and means carried by the piston-rod of the cylinder 2 for actuating said catch.

7. In a device of the class described, the combination of the cylinders 1 and 2, pistons operating in said cylinders, piston-rods for said pistons, springs connecting the cylinders of the piston-rods for holding the pistons in a predetermined position, a catch coöperating with the piston-rod of the cylinder 1, and a projection carried by the piston-rod of the cylinder 2 for actuating the catch aforesaid.

8. In a device of the class described, the combination of the cylinders 1 and 2, an outlet-cylinder 1, a valved outlet for the cylinder 2, pistons operating in the cylinders 1 and 2, piston-rods for said pistons, springs arranged in the hollow portions of the piston-rods for holding the pistons at a predetermined position, a catch coöperating with the piston-rod of the cylinder 1, and means carried by the piston-rod of the cylinder 2 for actuating said catch.

In testimony whereof I affix my signature in presence of two witnesses.

WILLIAM H. GREENE. [L. S.]

Witnesses:
T. F. JAMISON,
J. W. LEWIS.